(12) United States Patent
Gaudreault et al.

(10) Patent No.: US 7,389,971 B2
(45) Date of Patent: Jun. 24, 2008

(54) LEVERAGE TOOL FOR TIGHTENING DEVICES

(76) Inventors: Sylvain Gaudreault, 4040, Des Saules, Jonquière, QC (CA) G8A 2G7; Jules Savard, 38, Chemin du Domaine Grandmont, Saint-Gédéon, QC (CA) G0W 2P0

( * ) Notice: Subject to any disclaimer, the term of this patent is extended or adjusted under 35 U.S.C. 154(b) by 0 days.

(21) Appl. No.: 11/503,910

(22) Filed: Aug. 15, 2006

(65) Prior Publication Data

US 2007/0215848 A1  Sep. 20, 2007

(51) Int. Cl.
*B21F 9/00* (2006.01)
(52) U.S. Cl. .................. 254/243; 254/123; 254/131; 410/103; 410/112; 16/110.1; 74/543; 74/544; 81/177.2
(58) Field of Classification Search ............ 254/131, 254/120, 123, 129, 298, 333; 410/98, 100, 410/103, 77, 12, 96, 97, 156; 74/543, 544; 16/111, 110.1, 114.1; 7/143, 100; 81/177.2
See application file for complete search history.

(56) References Cited

U.S. PATENT DOCUMENTS

| | | | |
|---|---|---|---|
| 3,119,278 A | 1/1964 | Simpson | |
| 3,657,944 A | 4/1972 | Able | |
| 3,843,981 A * | 10/1974 | Verest | 7/170 |
| 3,985,338 A * | 10/1976 | Herrmann | 254/131 |
| 4,183,503 A * | 1/1980 | Ward | 254/131 |
| 4,227,286 A | 10/1980 | Holmberg | |
| 4,236,427 A | 12/1980 | Becnel | |
| 4,644,600 A | 2/1987 | Fugate | |
| 4,748,704 A * | 6/1988 | Houdek | 7/143 |
| 4,873,742 A | 10/1989 | Dillon | |
| D355,832 S * | 2/1995 | Downey | D8/107 |
| 5,425,154 A | 6/1995 | Edwards, Jr. | |
| 5,428,853 A * | 7/1995 | Menke et al. | 7/138 |
| 5,433,565 A | 7/1995 | Chan | |
| 5,524,505 A * | 6/1996 | Lawrence | 74/544 |
| 5,549,429 A * | 8/1996 | Sergent | 410/96 |
| D378,490 S * | 3/1997 | Campbell et al. | D8/319 |
| 5,988,595 A * | 11/1999 | DeVincent | 254/243 |
| 6,092,437 A * | 7/2000 | Sumner | 74/544 |
| 6,139,233 A | 10/2000 | Wilsey | |
| 6,196,092 B1 * | 3/2001 | Potter | 81/488 |
| 6,202,985 B1 * | 3/2001 | Chong et al. | 254/131 |
| 6,308,596 B1 * | 10/2001 | Williams | 81/177.2 |
| 6,318,216 B1 | 11/2001 | Eggert et al. | |
| 6,659,697 B1 * | 12/2003 | Guenther | 410/103 |
| 2006/0013667 A1 | 1/2006 | Ruan | |

FOREIGN PATENT DOCUMENTS

WO  WO 2005/110810  11/2005

* cited by examiner

*Primary Examiner*—Emmanuel M Marcelo
(74) *Attorney, Agent, or Firm*—Ogilvy Renault, LLP

(57) ABSTRACT

A tightening device leverage tool includes a bar member with a bar axis; a first receiver mounted to the bar member, and a second receiver mounted to the bar member and spaced-apart along the bar axis from the first receiver. The first and the second receivers are simultaneously engageable with a respective one of a first ratchet buckle member and a second ratchet buckle member, spaced apart from one another, for pivoting at least one of the first and the second ratchet buckle members about a pivot axis.

24 Claims, 7 Drawing Sheets

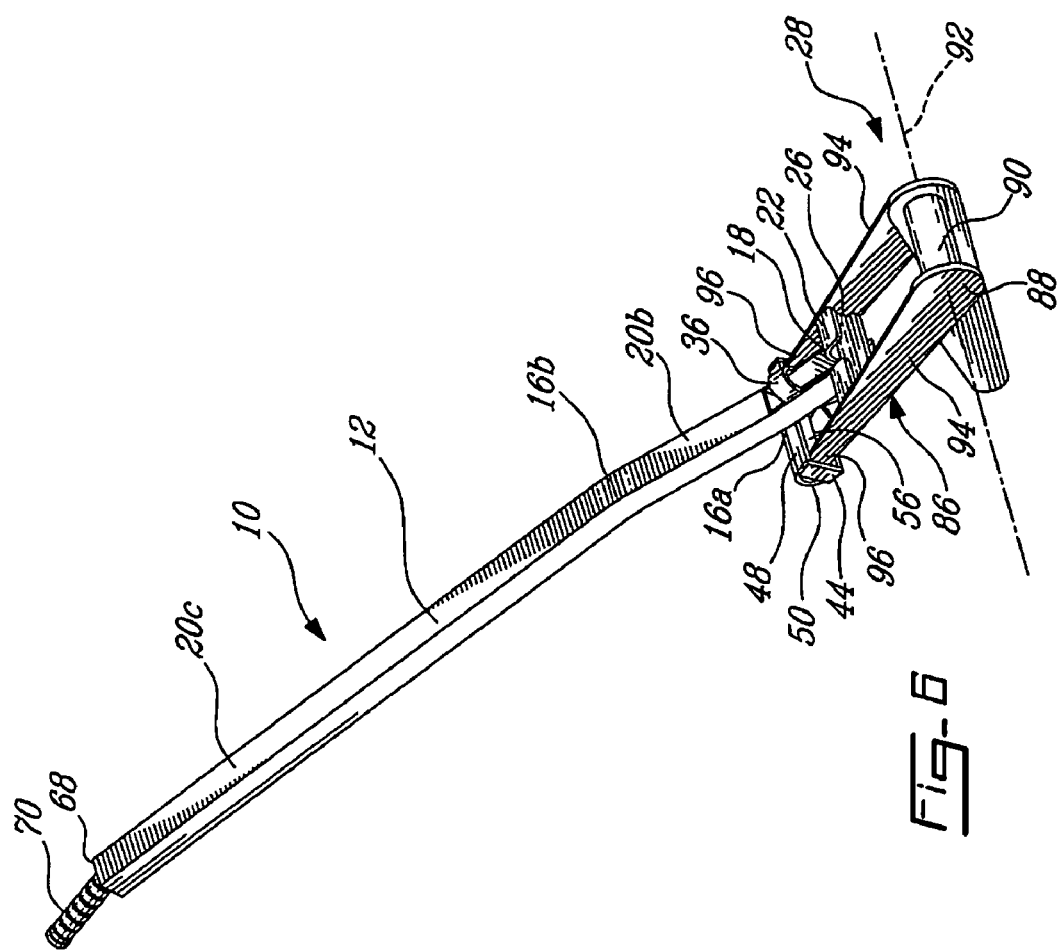

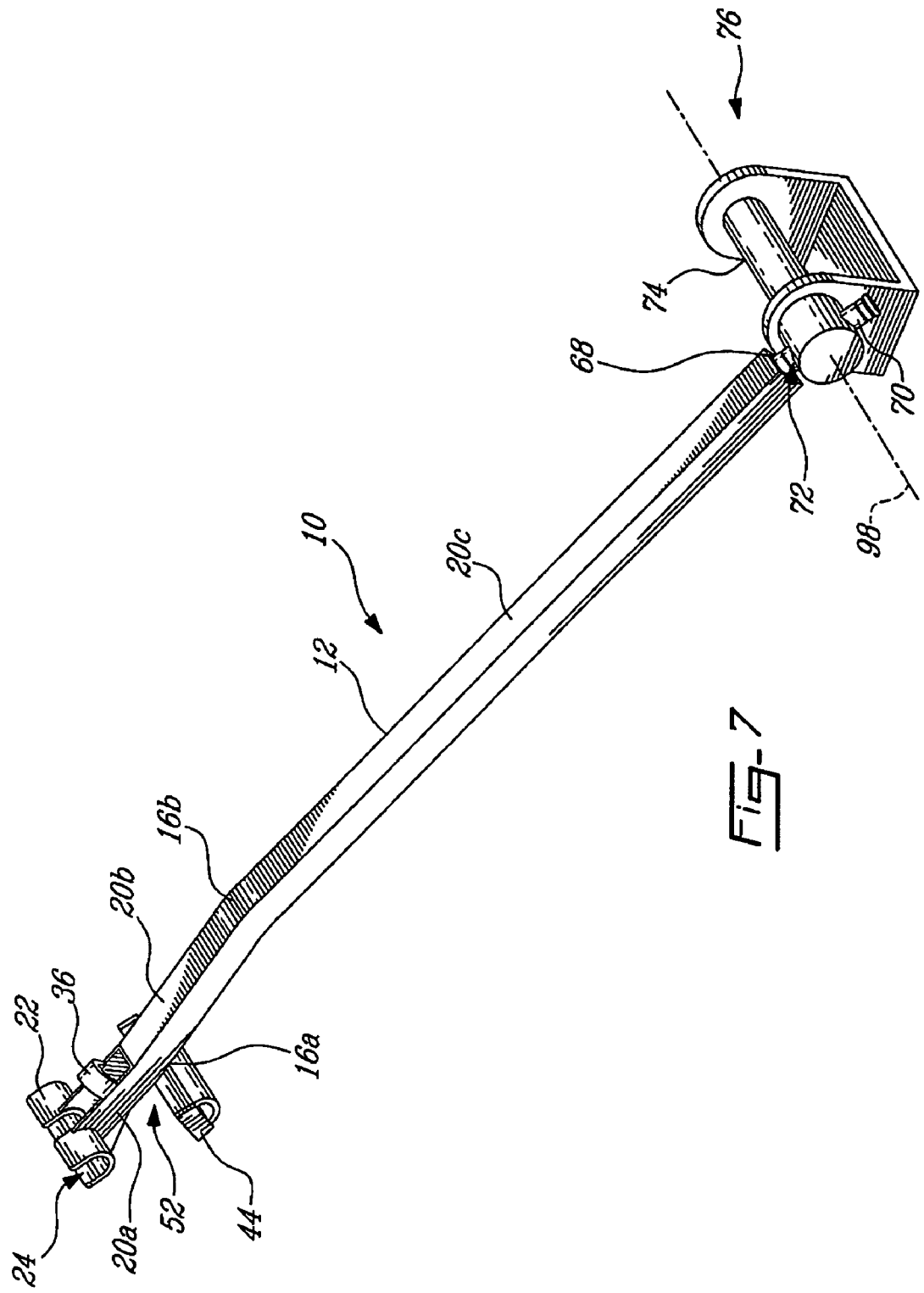

LEVERAGE TOOL FOR TIGHTENING DEVICES

CROSS-REFERENCE TO RELATED APPLICATIONS

This application claims priority of Canadian patent application No. 2,538,928 filed on Feb. 28, 2006, the specification of which is hereby incorporated by reference.

FIELD OF THE INVENTION

The invention relates to a leverage tool for either tightening or releasing a tension member mounted to a tightening device.

DESCRIPTION OF THRE RELATED ART

Commonly used tie-down devices in the field of cargo handling typically include a tension member such as a strap or a chain, and a tightening device such as a winch, a ratchet buckle or a chain binder, which is used to adjust the tension in the tension member, thereby tying a load down against a trailer. The tension member typically has a first end fixed to one side of a trailer, and a second end removably attached to the other side of the trailer. Depending on the type of tightening device, it can be provided at either side of the trailer, or at an intermediate point along the tension member.

Different types of tools are used for leverage with different types of tightening devices. Different types of tightening devices are used for different types of cargo, and sometimes a single trailer can include two or more types of tightening devices. This is sometimes problematic for truck loading workmen which do not always have the proper tool for operating a specific tightening device. Further, operating certain tightening devices by hand, or with a wrong tool has been known to cause certain injuries amongst workmen.

There are needs felt in the field of tightening device operation to facilitate the tightening or releasing process, to increase versatility of leverage tools, to reduce the risk of injury, and reduce the time required by workmen to operate tightening devices.

BRIEF SUMMARY OF THE INVENTION

It is therefore an aim of the present invention to address at least some of the above mentioned issues.

According to an aspect, there is provided a leverage tool for operating a ratchet buckle having an operating lever pivotable about a pivot axis. The leverage tool comprises: a bar member having a bar axis with a first receiver and a second receiver spaced-apart from the first receiver along the bar axis, the first receiver being engageable with a first ratchet buckle member and the second receiver being engageable simultaneously with an operating lever member, spaced-apart from the first ratchet buckle member, for pivoting the operating lever about the pivot axis.

According to another aspect, there is provided a tightening device leverage tool comprising: a bar member with a bar axis; a first receiver mounted to the bar member; and a second receiver mounted to the bar member and spaced-apart along the bar axis from the first receiver, the first and the second receivers being simultaneously engageable with a respective one of a first ratchet buckle member and a second ratchet buckle member, spaced apart from one another, for pivoting at least one of the first and the second ratchet buckle members about a pivot axis.

According to another aspect, there is provided a tightening device leverage tool comprising: a bar member with a bar axis; a ratchet buckle adapter mounted to the bar member and engageable with an operating lever of a ratchet buckle for pivoting the operating lever about a ratchet buckle pivot axis; and a binder adapter provided on the bar member and engageable with a binder handle for pivoting the binder handle about a binder pivot axis.

According to a further aspect, there is provided a tightening device leverage tool. The tightening device leverage tool comprises: a bar having a first end and a second end; a first receiver having a C-shaped cross-section, the first receiver being positioned transversally at first end of the bar with a receiving opening oriented away from the first end; a second receiver having a C-shaped cross-section, the second receiver being positioned transversally below the bar, at a predetermined distance from the first receiver, and with a receiving opening oriented towards the first end; a channel defined in the bar, adjacent the first end; a handle retention member above a section of the channel; whereby the leverage tool can be used to handle either a ratchet buckle by engaging the first receiver and the second receiver onto a first and a second ratchet buckle elements, respectively, or a load binder by engaging a binder handle in the channel below the handle retention member.

According to a general aspect, there is provided a leverage tool for operating a ratchet buckle having an operating lever pivotable about a pivot axis and a first ratchet buckle member, spaced-apart from the operating lever. The leverage tool comprises: a bar member having a bar axis with a first receiver, positioned at a first end of the bar member, and a second receiver spaced-apart from the first receiver along the bar axis, the first receiver being engageable with the first ratchet buckle member and the second receiver being engageable simultaneously with the operating lever member for pivoting the operating lever about the pivot axis; and a handle insertion channel defined continuously in a section of the bar member, contiguous to the first end of the bar member and the first receiver, and a handle retention member mounted to the bar member and extending above a longitudinal opening of the handle insertion channel, the handle insertion channel being designed to at least partially insert therein a binder handle, the handle retention member preventing the binder handle from being released from the handle insertion channel while pivoting the binder handle about a pivot axis of a binder.

According to another general aspect, there is provided a tightening device leverage tool for operating a ratchet buckle having a first ratchet buckle member and a second ratchet buckle member, spaced apart from one another. The tightening device leverage tool comprises: a bar member with a bar axis; a first receiver mounted to the bar member; a second receiver mounted to the bar member and spaced-apart along the bar axis from the first receiver, the first and the second receivers being simultaneously engageable with a respective one of the first ratchet buckle member and the second ratchet buckle member for pivoting at least one of the first and the second ratchet buckle members about a pivot axis; and a handle insertion channel defined continuously in a section of the bar member, contiguous to a first end of the bar member, and one of the first and the second receivers, and a handle retention member mounted to the bar member and extending above a longitudinal opening of the handle insertion channel, the handle insertion channel being designed to at least partially insert therein a binder handle and the handle retention member preventing the binder handle from being released from the handle insertion channel while pivoting the binder handle about a pivot axis of a binder.

According to another general aspect, there is provided a tightening device leverage tool for operating a ratchet buckle having an operating lever pivoting about a ratchet buckle pivot axis. The tightening device leverage tool comprises: a bar member with a bar axis and having a first section adjacent the first end, a second section defining a first obtuse angle with the first section, and a third section being longer than said first and second sections and defining a second obtuse angle with the second section; a ratchet buckle adapter mounted to the bar member and engageable with the operating lever of the ratchet buckle for pivoting the operating lever about the ratchet buckle pivot axis; and a binder adapter provided on the bar member and engageable with a binder handle for pivoting the binder handle about a binder pivot axis.

According to a further general aspect, there is provided a tightening device leverage tool for handling either a ratchet buckle having a first and a second ratchet buckle elements or a load binder having a binder handle. The tightening device leverage tool comprises : a bar having a first end and a second end; a first receiver having a C-shaped cross-section, the first receiver being positioned transversally at first end of the bar with a receiving opening oriented away from the first end; a second receiver having a C-shaped cross-section, the second receiver being positioned transversally below the bar, at a predetermined distance from the first receiver, and with a receiving opening oriented towards the first end; a channel defined in the bar adjacent the first end; a handle retention member above a portion of the channel; whereby the leverage tool can be used to handle either the ratchet buckle by engaging the first receiver and the second receiver onto the first and the second ratchet buckle elements, respectively, or the load binder by engaging the binder handle in the channel below the handle retention member.

According to still a further general aspect, there is provided a leverage tool for operating a ratchet buckle having an operating lever pivotable about a pivot axis and a first ratchet buckle member, spaced-apart from the operating lever. The leverage tool comprises: a bar member having a bar axis with a first receiver and a second receiver spaced-apart from the first receiver along the bar axis, the first receiver being engageable with the first ratchet buckle member and the second receiver being engageable simultaneously with the operating lever member for pivoting the operating lever about the pivot axis; and the bar member has a first section adjacent the first end, a second section defining a first obtuse angle with the first section, and a third section being longer than said first and second sections and defining a second obtuse angle with the second section.

According to still another general aspect, there is provided a tightening device leverage tool for operating a ratchet buckle having an operating lever pivoting about a ratchet buckle pivot axis. The tightening device leverage tool comprises: a bar member with a bar axis; a ratchet buckle adapter mounted to the bar member and engageable with the operating lever of the ratchet buckle for pivoting the operating lever about the ratchet buckle pivot axis; and a binder adapter provided on the bar member and engageable with a binder handle for pivoting the binder handle about a binder pivot axis, the binder adapter having a handle insertion channel defined continuously in a section of the bar member, contiguous to a first end of the bar member, and the ratchet buckle adapter, and a handle retention member mounted to the bar member and extending above a longitudinal opening of the handle insertion channel, the handle insertion channel being designed to at least partially insert therein the binder handle and the handle retention member preventing the binder handle from being released from the handle insertion channel while pivoting the binder handle about the binder pivot axis.

According to another general aspect, there is provided a tightening device leverage tool for operating a ratchet buckle having an operating lever pivoting about a ratchet buckle pivot axis. The tightening device leverage tool comprises: a bar member with a bar axis; a ratchet buckle adapter mounted to the bar member and engageable with the operating lever of the ratchet buckle for pivoting the operating lever about the ratchet buckle pivot axis; and a binder adapter provided on the bar member and engageable with a binder handle for pivoting the binder handle about a binder pivot axis and having binder handle lateral stabilizers mounted to the bar member, proximate to a first end thereof, extending substantially parallel to the bar axis and being spaced apart from one another to receive therebetween a section of the binder handle, a rear end of the binder handle being simultaneously inserted in the ratchet buckle adapter.

In this specification, the term "tension member" is intended to mean chains, cables, straps, bands, and the like, which can be flexible or not. The term "tightening device" is intended to mean, without being limitative, strap ratchet buckles, chain binders, load tighteners, winches, etc.

BRIEF DESCRIPTION OF THE DRAWINGS

FIG. 6 is a perspective view the leverage tool shown in FIG. 1 wherein the leverage tool is engaged with a ratchet buckle; and FIG. 7 is a perspective view the leverage tool shown in FIG. 1 wherein the leverage tool is engaged with a winch.

It will be noted that throughout the appended drawings, like features are identified by like reference numerals.

DETAILED DESCRIPTION

Figure 1:
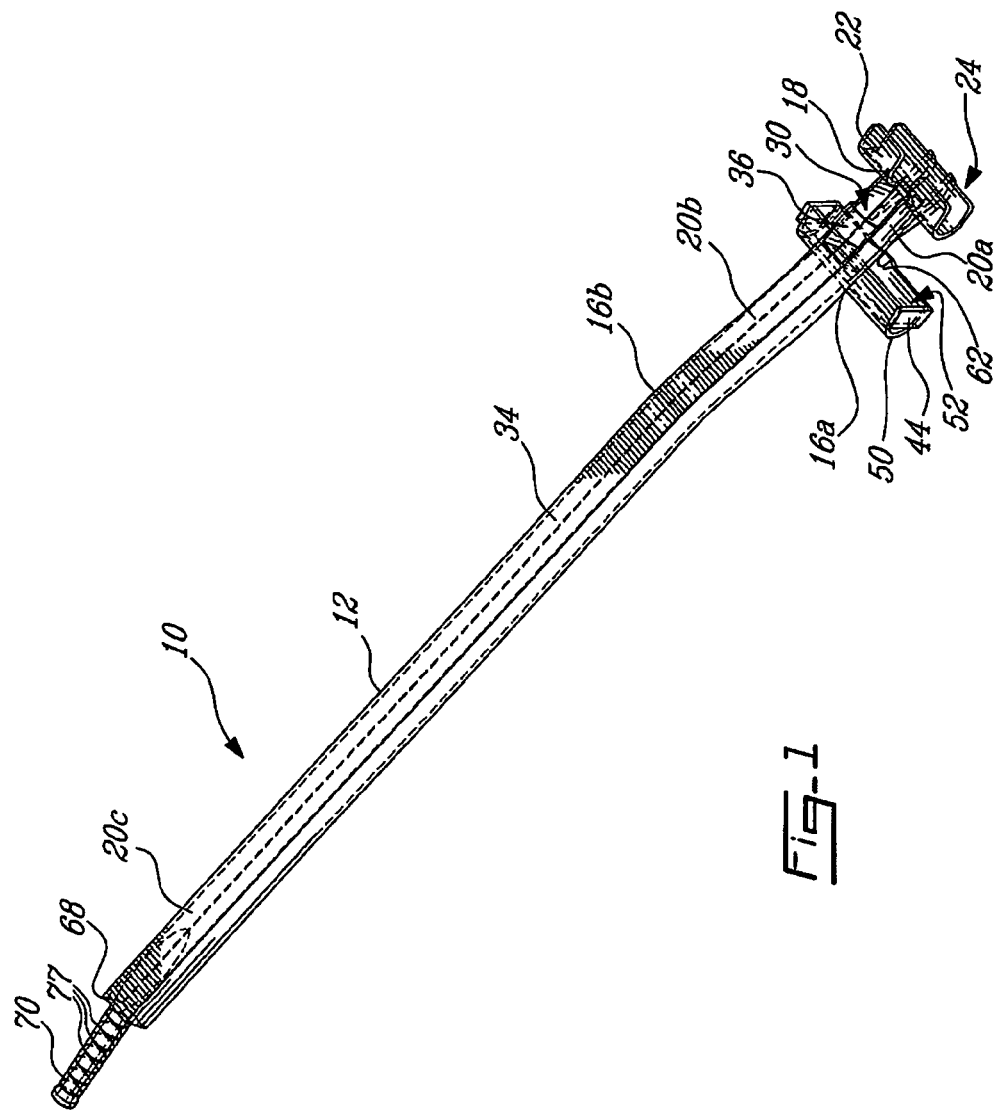
FIG. 1 is a perspective view of a leverage tool in accordance with an embodiment of the invention.
Figure 2:
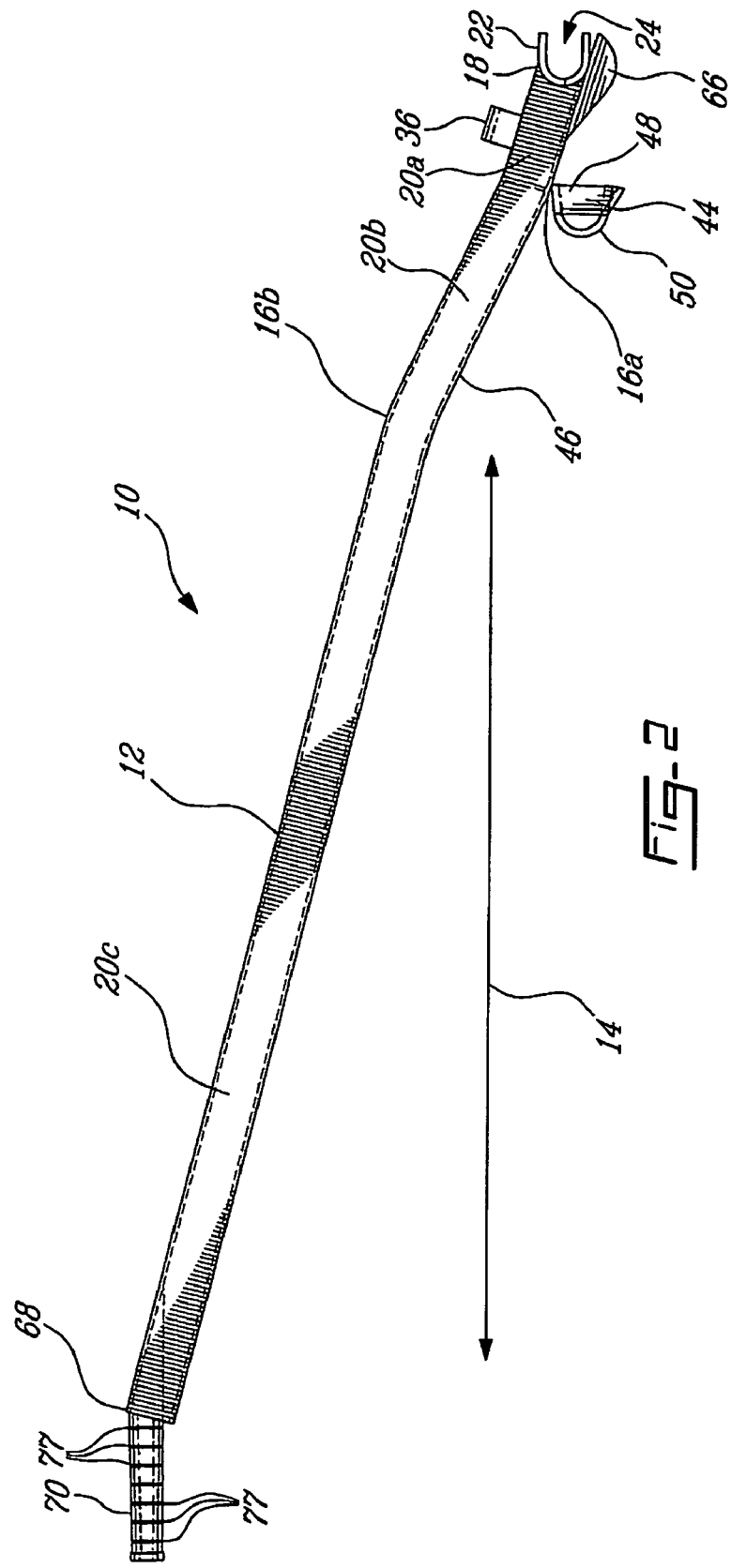
FIG. 2 is a side elevation view of the leverage tool shown in FIG. 1.
Figure 3:
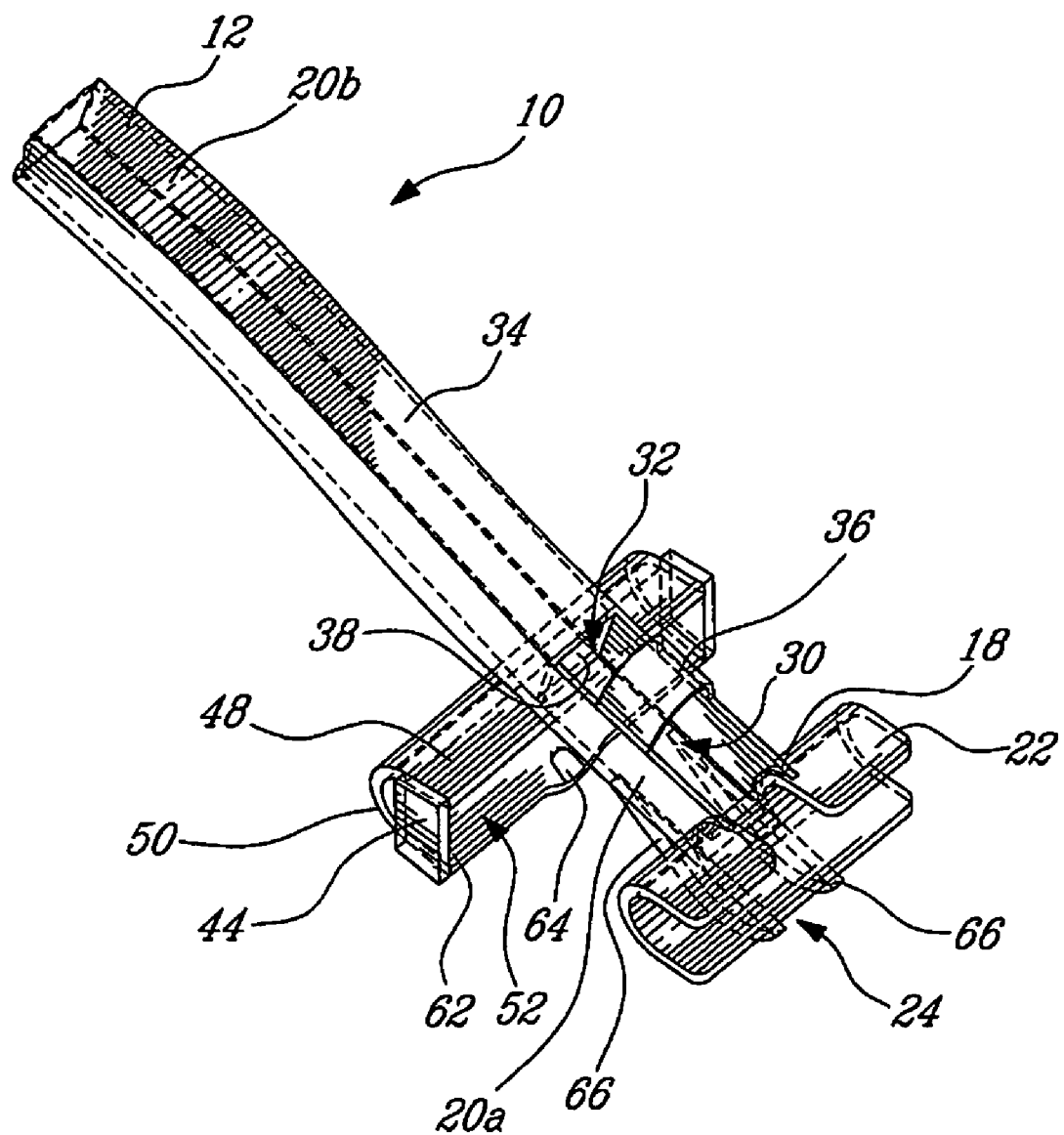
FIG. 3 is a perspective view, enlarged and fragmented, of a first end of the leverage tool shown in FIG. 1.

Referring now to the figures and, more particularly referring to FIGS. 1 to 3, it will be seen a leverage tool 10, or tightening device leverage tool, in accordance with an embodiment. The leverage tool 10 includes a bar member 12 with a length extending along a bar axis 14, a width, and a height. In this example, the bar member 12 has a rectangular cross-section and is angled along its length at two angle points 16a, 16b, thus defining a first segment 20a, a second segment 20b, and a third segment 20c. As it will be described in more details below, the bar member 12 is angled to ease the manipulation of the leverage tool 10 by a workman.

A first receiver 22 is mounted to the first end 18 of the bar member 12. The first receiver 22 has a C-channel shape with an open end 24 facing the first end 18 and is mounted substantially perpendicular to the bar axis 14. The first receiver 22 is designed to engage a first ratchet buckle member 26 at an intermediary point of a ratchet buckle 28 (FIG. 6) when operating the leverage tool 10, as will be described in more details below.

The bar member 12 also includes, contiguous to the first end 18, a handle insertion channel 30 which extends in the first segment 20a of the bar member 12 contiguous to the first end 18. The handle insertion channel 30 is defined in the rectangular cross-section of the bar member 12 and has a longitudinal opening 32 defined in an upper wall 34 of the bar member 12. The handle insertion channel 30 and the longitudinal opening 32 extends continuously in the first receiver 22.

A handle retention member 36 is mounted to the bar member 12 and extends upwardly above the longitudinal opening 32 proximate to a rear end 38 of the handle insertion channel 30. The handle insertion channel 30 is designed to receive therein a rear end 40 of a binder handle 42 (FIG. 4), for tie-down, as will be described in more details below. The handle retention member 36 prevents the binder handle 42 from sliding outside the handle insertion channel 30 while tightening a tension member (not shown) mounted to the binder handle 42.

The leverage tool 10 also includes a second receiver 44, which is mounted to a lower wall 46 of the bar member 12 and extends substantially perpendicular to the bar axis 14 and parallel to the first receiver 22. The second receiver 44 has a peripheral wall 48 and a C-shaped bottom wall 50 and defines a cavity 52 therein with an open end facing the first end 18 of the bar member 12. The second receiver 44 is designed to engage the end of a ratchet buckle handle 56, or a second ratchet buckle member, of the ratchet buckle 28 (FIG. 6) simultaneously while the first ratchet buckle member 26 is engaged in the first receiver 22, as will be described in more details below. The combination of the engagement of the longitudinally distal first receiver 22 and second receiver 44 of the illustrated example allows activation of the ratchet buckle handle in both directions using the leverage tool 10.

The lower wall 62 of the second receiver 44 has a channel 64 defined centrally therein, defining a protuberance of the outer face of the second receiver 44, and extending substantially parallel to the bar axis 14. The channel 64 facilitates the withdrawal of the rear end 40 of the binder handle 42 after having pivoted the binder handle 42 relatively to a pivot axis for releasing tension in a tension member mounted to the binder handle 42, as will be described in more details below. The C-shaped bottom wall 50 prevents the rear end 40 of the binder handle 42 from sliding rearwardly when engaged in the second receiver 44.

Figure 5:
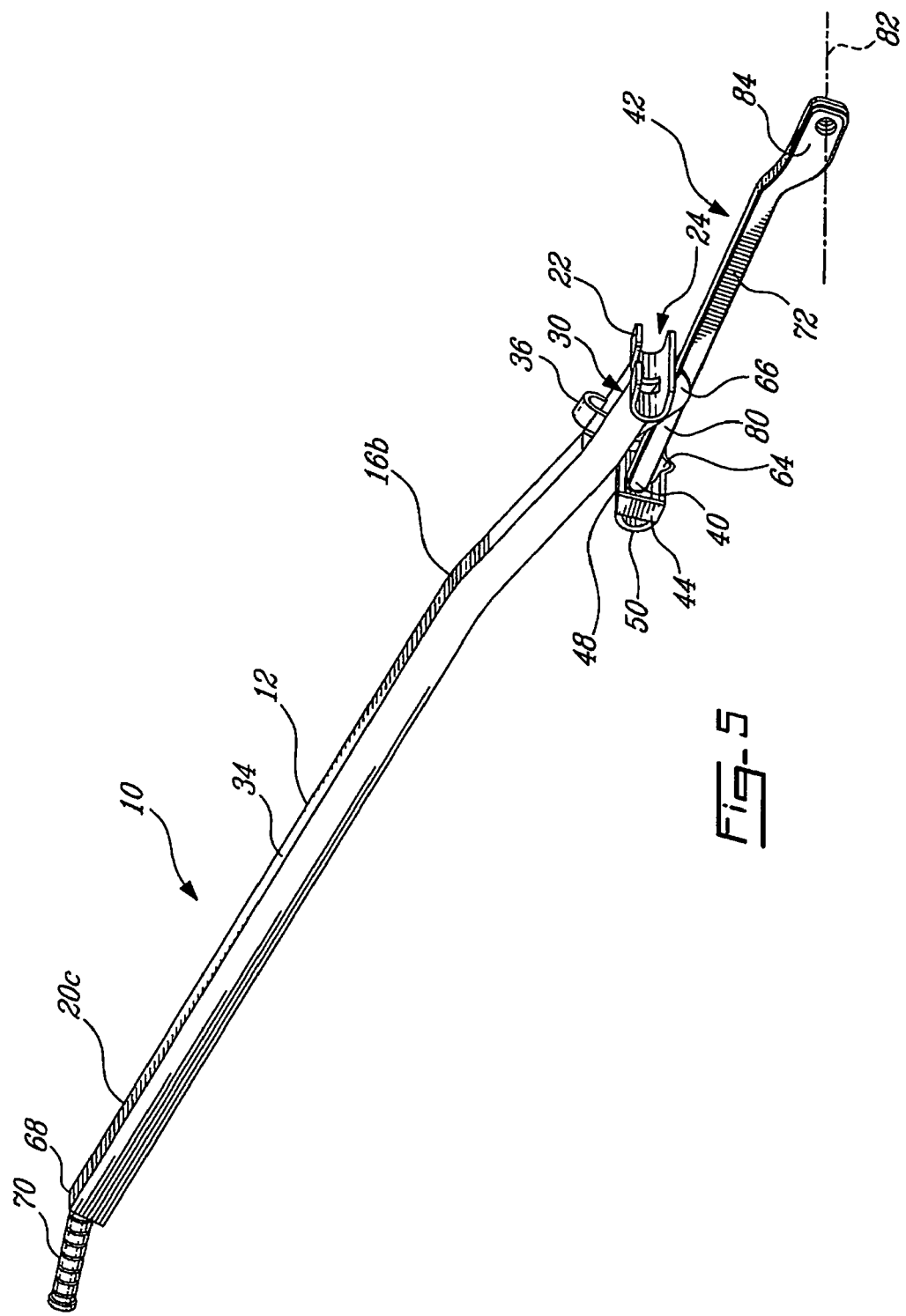
FIG. 5 is a perspective view the leverage tool shown in FIG. 1 wherein the leverage tool is engaged with the binder handle for releasing tension.

Two binder handle lateral stabilizers 66 are mounted to the bar member 12, proximate to the first end 18. The lateral stabilizers 66 extend substantially parallel to one another and are spaced apart. The lateral stabilizers 66 are substantially parallel to the bar axis 14 and extend between the second receiver 44 and the first end 18 of the bar member 12. The spacing defined between the two lateral stabilizers 66 allows the insertion of the binder handle 42 when its rear end 40 is inserted in the second receiver 44 (FIG. 5). The lateral stabilizers 66 laterally stabilize the binder handle 42 when received in the second receiver 44.

The bar member 12 has a second end 68 opposed to the first end 18. A winch bar 70 is mounted to the second end 68 of the bar member 12. The winch bar 70 is engageable in a receiving aperture 72 defined in a winding drum 74 of a winch 76 (FIG. 7). In the example, the winch bar 70 has a circular cross-section with a diameter smaller than the diameter of the bar member 12. However, it is appreciated that, in an alternate embodiment, the shape and the size of the winch bar 70 can vary in accordance with the shape and the size of a corresponding receiving aperture 72.

As shown in FIG. 2, the winch bar 70 extends substantially parallel to the bar axis 14 but is not in line with the segment 20c of the bar member 12. The winch bar 70 defines an angle with the segment 20c. In an alternate embodiment, it could be in-line therewith.

The outer surface of the winch bar 70 includes a plurality of circumferential grooves 77, extending substantially parallel to one another. The grooves 77 provide slip resistance to the winch bar 70 when inserted in the receiving aperture 72.

Therefore, the leverage tool 10 includes a plurality of tightening device adapters designed to be engaged with tightening devices of different kinds for either releasing or tightening a tension member. Proximate to the first end 18 of the bar member 12, the leverage tool 10 includes a ratchet buckle adapter, including first receiver 22 and second receiver 44, mounted to the bar member 12. The ratchet buckle adapter is engageable with an operating lever 86 (FIG. 6) of a ratchet buckle for pivoting the operating lever 86 relatively to a ratchet buckle pivot axis 92 (FIG. 6).

Figure 4:
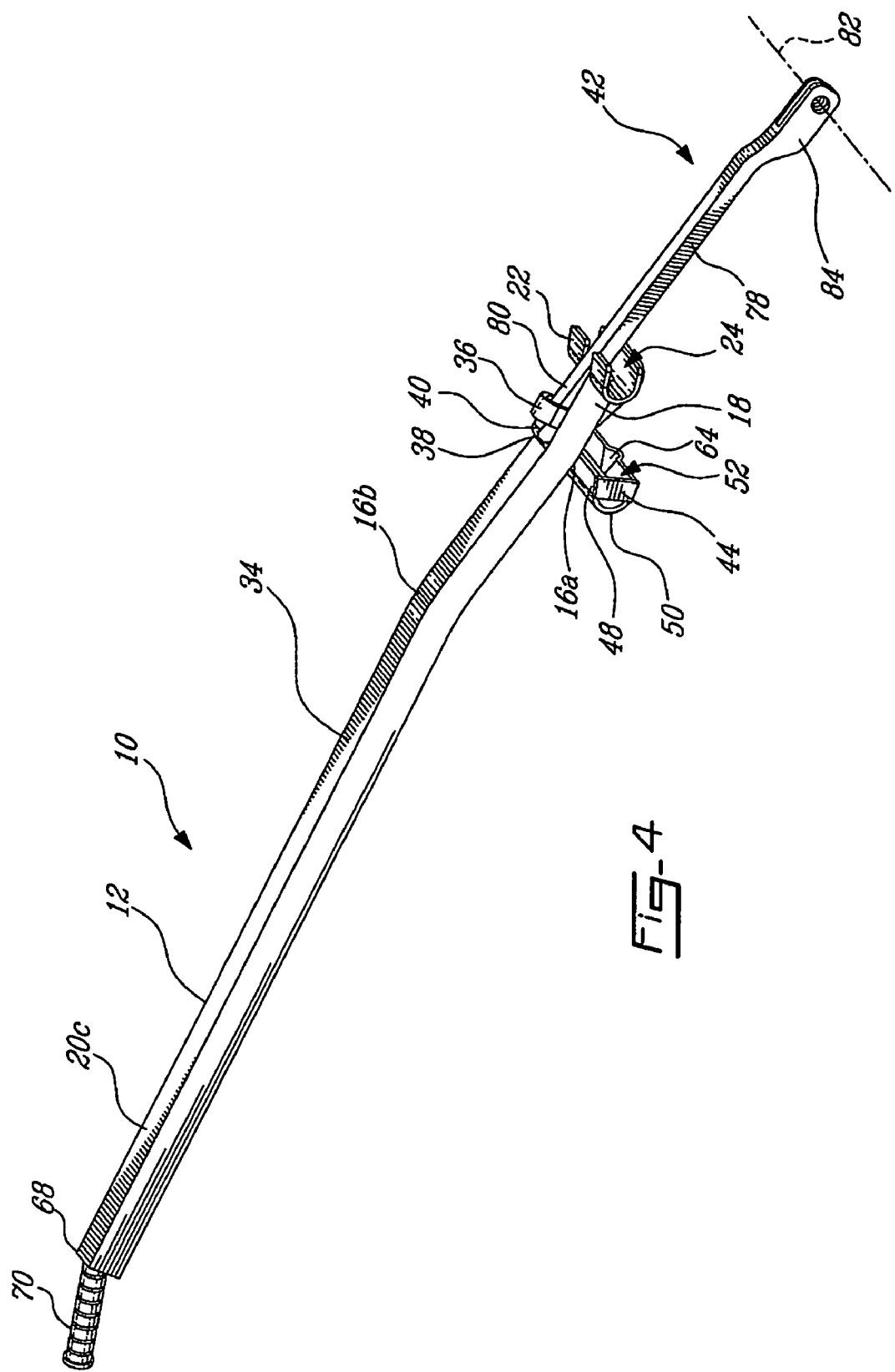
FIG. 4 is a perspective view the leverage tool shown in FIG. 1 wherein the leverage tool is engaged with a binder handle for increasing tension.

Proximate to the first end 18 of the bar member 12, the leverage tool 10 also includes a binder adapter for activating a binder handle. The binder adapter has a first member defined in the bar member 12, i.e. the handle insertion channel 30, and a second member, i.e. the handle retention member 36, mounted to the bar member 12 and extending above the handle insertion channel 30. A binder handle 42 (FIG. 4) is engageable with the binder adapter for pivoting the binder handle 42 relatively to a binder pivot axis 84 (FIG. 4). The leverage tool 10 includes another binder adapter, which includes the channel 64 defined in the second receiver 44 and the binder handle lateral stabilizers 66, and is engageable with the binder handle 42.

At the second end 68 of the bar member 12, the leverage tool 10 includes a winch adapter. The winch adapter includes the winch bar 70 engageable with the receiving aperture 72 defined in the winding drum 74 of the winch 76.

A single tool can thus be used for either releasing or tightening ratchet buckles, chain binders, and winches, by using the features of the leverage tool 10.

Referring now to FIGS. 4 to 7, it will be seen how the leverage tool 10 can be used to either tie down or release several tightening devices and, more particularly, a binder having a binder handle 42, a ratchet buckle 28, and a winch 76. When mounted to the tightening device, the leverage tool 10 is actuated manually to either release or tighten a tension member mounted to the tightening device. Manual activation of the leverage tool 10 produces a manual activation of the tightening device. For instance, for tightening a tension member, the leverage tool 10 is moved in a counter-clockwise direction while, for releasing the tension member, the leverage tool 10 is moved in a clockwise direction. It is appreciated that, in an alternate embodiment, the leverage tool 10 can be moved in a clockwise direction for tightening the tension member while, for releasing the tension member, the leverage tool 10 is moved in the counter-clockwise direction.

Referring now to FIG. 4, it will be seen how the leverage tool 10 is engaged with the binder handle 42, which can be that of either a chain binder or a strap binder, for adjusting the tension of a tension member (not shown). The binder handle 42 has a rear section 80, proximate to the rear end 40, which is engaged in the handle insertion channel 30 with the rear end 40 abutting the rear end 38 of the handle insertion channel 30. When pivoting the binder handle 42 relatively to a pivot axis 82, located at a front end 84 opposed to the rear end 40, the leverage tool 10 increases the force applied at the front end 84. The retention member 36, extending above the bar member 78, prevents the binder handle 42 from being released from the insertion channel 30 while tying down the tension member.

Referring now to FIG. 5, it will be seen how the leverage tool 10 is used for releasing the tension of a tension member (not shown). The rear end 40 of the binder handle 42 is inserted in the second receiver 44. The C-shaped wall member 50 prevents the binder handle 42 from sliding rearwardly relatively to the leverage tool 10. The bar member 78 of the binder handle 42 extends between the two lateral stabilizers 66. The lateral stabilizers 66 laterally stabilize the binder handle 42 while pivoting the latter relatively to the pivot axis 82.

For releasing the binder handle 42, the leverage tool 10 is typically pivoted once relatively to the pivot axis 82. Once pivoted, the binder handle 42 is released from the tool 10 by sliding outwardly of the second receiver 44, through the channel 64, and the lateral stabilizers 66.

Referring now to FIG. 6, it will be seen how the leverage tool 10 is used to adjust tension with a ratchet buckle 28. The ratchet buckle 28 has an operating lever 86 which is pivotally mounted, at one end 88 thereof, on a strap reel 90 having a pivot axis 92. The operating lever 86 includes two limbs 94 rigidly interconnected by means of the handle 56 at the other end 96 of the operating lever 86. The first ratchet buckle member 26 is mounted to the limbs 94 between the both ends 88, 96. For either tying down or releasing the tension member, the first ratchet buckle member 26 of the operating lever 86 is inserted in the first receiver 22 and the handle 56 is inserted in the second receiver 44. The operating lever 86 can therefore be pivoted about the pivot axis 92 for either tying down or releasing the tension member mounted to the ratchet buckle 28.

It will be appreciated that the first receiver 22 and the second receiver 44 can be engaged with other components of the ratchet buckle 28 instead of the first ratchet buckle member 26 and the handle 56. For example, without being limitative, the first receiver 22 can be engaged with a component of the strap reel 90, or proximate thereof, while the second receiver 44 can be engaged with any component of the operating lever 86 for pivoting the latter about the pivot axis 92. The shape of the first receiver 22 and the second receiver 44 can be modified in accordance with the components they are engaged with.

Referring to FIG. 7, it will be seen how the leverage tool 10 is used for either tying down or releasing a tension member (not shown) mounted to a winch 76. The winch 76 includes a winding drum 74 with a rotation axis 98 and winch bar receiving apertures 72 therein. For tightening or releasing the tension member, the winch 76 is either wind or unwind, i.e. rotated either clockwise or counter clockwise. The winch bar 70 of the leverage tool 10 is inserted in one of the winch bar receiving apertures 72 for rotating the winding drum 74 relatively to the rotation axis 98 for either tying down or releasing the tension member. Therefore, the diameter of the winch bar 70 is dimensioned to be inserted into the winch bar receiving apertures 72.

When a tightening device is actuated and the handle 42, the operating lever 86, or the bar member 12 of the tightening device moves past a dead center position, the handle has a tendency to snap into its final position and this snapping action is quite dangerous since it may injure the workman's fingers or hands or other parts of the body. The bar member 12 of the leverage tool 10 is designed in three sections, angled relatively to one another, so that injury to the hand or other parts of the workman's body can be prevented. The angle points 16a, 16b are designed to increase to the spacing between the bar member 12 and the item (not shown) to which the tightening device is mounted to or the cargo. Therefore, the leverage tool 10 is designed to prevent injury to workmen when the handle 42, the operating lever 86, or the bar member 12 of the tightening device moves past a dead center.

The leverage tool 10 is detachable in that it can mounted to and dismounted from tightening devices. The leverage tool 10 can be removably mounted to the tightening devices at times when required. After the leverage tool 10 has been used for either tightening or releasing a tension member mounted to a tightening device, the tool 10 can be disengaged or removed from the tightening device.

The leverage bar or tool 10 is efficient in operation. For each tightening device, the leverage tool 10 increases the force applied to the tightening device while either tying down or releasing the tension member mounted to the tightening device. Moreover, the angled shape of the bar member 12 prevents the workman from possible injury by having his hands engaged between the tool 10 and the cargo, which is bound with the tension member. Moreover, the angled shape of the bar member 12 allows to engage the tool 10 with the tightening device in any position, even if the operating lever or the handle is juxtaposed to the tension member.

Moreover, the leverage tool 10 is constructed so that it can be conveniently gripped in a hand and facilitating its manual manipulation.

The leverage tool 10 adds leverage to a part of the tightening device, such as the handle, so that not only does the leverage tool 10 function as a safety device, but in addition it provides a means for increasing leverage of the tightening device.

A single tool is required for either releasing or tightening ratchet buckles, chain binders, and winches. Therefore, the workman always has an adequate leverage tool for tightening devices of three different types.

In an embodiment, the leverage tool 10 is approximately 40 inches long, including the winch bar 70 and the first receiver 22. The spacing between the front ends of the first receiver 22 and the second receiver 44 is approximately 4 inches. The first, second, and third segments 20a, 20b, 20c are respectively approximately 3, 6, and 26 inches long. The angles defined between the first and the second segments 20a, 20b, at angle point 16a, and between the second and the third segments 20b, 20c, at angle point 16b, are approximately 170°. The width and the weight of the bar member 12 are approximately 1.2 inches.

The embodiments of the invention described above are intended to be exemplary only.

As it will be appreciated, the leverage tool 10 can be used on several tightening devices (or binding device) for rapidly spooling, tightening or releasing the tension member of the tightening device.

The leverage tool 10 can be made of any suitable material and in different shapes.

The shape of the various adapters can vary in accordance with the tightening devices they are engaged with. Moreover, their locations along the bar member 12 can vary.

Since tightening devices are made in many different sizes, the leverage tool 10 can be made in different sizes in order to fit these different sizes of tightening devices.

It is appreciated that the tightening device can be a secured position or it can be displaceable along the trailer, for instance. For example, the tightening device can be mounted on rails.

The scope of the invention is therefore intended to be limited solely by the scope of the appended claims.

The invention claimed is:

1. A leverage tool for operating a ratchet buckle having an operating lever pivotable about a pivot axis and a first ratchet buckle member, spaced-apart from the operating lever, the leverage tool comprising: a bar member having a bar axis with a first receiver, positioned at a first end of the bar member, and a second receiver spaced-apart from the first receiver along the bar axis, the first receiver being engageable with the first ratchet buckle member and the second receiver being engageable simultaneously with the operating lever member for pivoting the operating lever about the pivot axis; and a handle insertion channel defined continuously in a section of the bar member, contiguous to the first end of the bar member and the first receiver, and a handle retention member mounted to the bar member and extending above a longitudinal opening of the handle insertion channel, the handle insertion channel being designed to at least partially insert therein a binder handle, the handle retention member preventing the binder handle from being released from the handle insertion channel while pivoting the binder handle about a pivot axis of a binder.

2. A leverage tool as claimed in claim 1, wherein at least one of the first receiver and the second receiver extends substantially perpendicular to the bar axis and has a C-channel shape with an open end.

3. A leverage tool as claimed in claim 2, wherein the first receiver is mounted to the first end of the bar member and the second receiver is engageable with a handle of the operating lever.

4. A leverage tool as claimed in claim 1, wherein the bar member has a first section adjacent the first end, a second section defining a first obtuse angle with the first section, and a third section being longer than said first and second sections and defining a second obtuse angle with the second section.

5. A leverage tool as claimed in claim 1, comprising binder handle lateral stabilizers mounted to the bar member, proximate to the first end thereof, extending substantially parallel to the bar axis and being spaced apart from one another to receive therebetween a section of the binder handle, a rear end of the binder handle being simultaneously inserted in the second receiver.

6. A leverage tool as claimed in claim 1, comprising a winch bar mounted to a second end of the bar member and insertable into a receiving aperture of a winding drum for rotating the winding drum about a rotation axis.

7. A tightening device leverage tool for operating a ratchet buckle having a first ratchet buckle member and a second ratchet buckle member, spaced apart from one another, the tightening device leverage tool comprising:
a bar member with a bar axis;
a first receiver mounted to the bar member;
a second receiver mounted to the bar member and spaced-apart along the bar axis from the first receiver, the first and the second receivers being simultaneously engageable with a respective one of the first ratchet buckle member and the second ratchet buckle member for pivoting at least one of the first and the second ratchet buckle members about a pivot axis; and
a handle insertion channel defined continuously in a section of the bar member, contiguous to a first end of the bar member, and one of the first and the second receivers, and a handle retention member mounted to the bar member and extending above a longitudinal opening of the handle insertion channel, the handle insertion channel being designed to at least partially insert therein a binder handle and the handle retention member preventing the binder handle from being released from the handle insertion channel while pivoting the binder handle about a pivot axis of a binder.

8. A tightening device leverage tool as claimed in claim 7, wherein at least one of the first and the second receivers extends substantially perpendicular to the bar axis and has a C-channel shape with an open end facing a first end of the bar member.

9. A tightening device leverage tool as claimed in claim 7, wherein the bar member has a first section adjacent the first end, a second section defining a first obtuse angle with the first section, and a third section being longer than said first and second sections and defining a second obtuse angle with the second section.

10. A tightening device leverage tool as claimed in claim 7, comprising binder handle lateral stabilizers mounted to the bar member, proximate to a first end thereof, extending substantially parallel to the bar axis and being spaced apart from one another to receive therebetween a section of the binder handle, a rear end of the binder handle being simultaneously inserted in one of the first and the second receivers.

11. A tightening device leverage tool for operating a ratchet buckle having an operating lever pivoting about a ratchet buckle pivot axis, the tightening device leverage tool comprising:
a bar member with a bar axis and having a first section adjacent the first end, a second section defining a first obtuse angle with the first section, and a third section being longer than said first and second sections and defining a second obtuse angle with the second section;
a ratchet buckle adapter mounted to the bar member and engageable with the operating lever of the ratchet buckle for pivoting the operating lever about the ratchet buckle pivot axis; and
a binder adapter provided on the bar member and engageable with a binder handle for pivoting the binder handle about a binder pivot axis.

12. A tightening device leverage tool as claimed in claim 11, wherein the ratchet buckle adapter comprises a first receiver and a second receiver spaced-apart from the first receiver along the bar axis, the first receiver being engageable with a ratchet buckle member and the second receiver being engageable simultaneously with an operating lever member, spaced-apart from the ratchet buckle member.

13. A tightening device leverage tool as claimed in claim 11, wherein the binder adapter comprises a handle insertion channel defined continuously in a section of the bar member, contiguous to a first end of the bar member, and the ratchet buckle adapter, and a handle retention member mounted to the bar member and extending above a longitudinal opening of the handle insertion channel, the handle insertion channel being designed to at least partially insert therein the binder handle and the handle retention member preventing the binder handle from being released from the handle insertion channel while pivoting the binder handle about the binder pivot axis.

14. A tightening device leverage tool as claimed in claim 11, wherein the binder adapter comprises binder handle lateral stabilizers mounted to the bar member, proximate to a first end thereof, extending substantially parallel to the bar axis and being spaced apart from one another to receive therebetween a section of the binder handle, a rear end of the binder handle being simultaneously inserted in the ratchet buckle adapter.

15. A tightening device leverage tool as claimed in claim 11, comprising a winch bar mounted to the bar member and engageable with a receiving aperture defined in a winding drum for rotating the winding drum about a rotation axis.

16. A tightening device leverage tool for handling either a ratchet buckle having a first and a second ratchet buckle elements or a load binder having a binder handle, the tightening device leverage tool comprising:
   a bar having a first end and a second end;
   a first receiver having a C-shaped cross-section, the first receiver being positioned transversally at first end of the bar with a receiving opening oriented away from the first end;
   a second receiver having a C-shaped cross-section, the second receiver being positioned transversally below the bar, at a predetermined distance from the first receiver, and with a receiving opening oriented towards the first end;
   a channel defined in the bar adjacent the first end;
   a handle retention member above a portion of the channel;
   whereby the leverage tool can be used to handle either the ratchet buckle by engaging the first receiver and the second receiver onto the first and the second ratchet buckle elements, respectively, or the load binder by engaging the binder handle in the channel below the handle retention member.

17. A leverage tool for operating a ratchet buckle having an operating lever pivotable about a pivot axis and a first ratchet buckle member, spaced-apart from the operating lever, the leverage tool comprising: a bar member having a bar axis with a first receiver and a second receiver spaced-apart from the first receiver along the bar axis, the first receiver being engageable with the first ratchet buckle member and the second receiver being engageable simultaneously with the operating lever member for pivoting the operating lever about the pivot axis; and the bar member has a first section adjacent the first end, a second section defining a first obtuse angle with the first section, and a third section being longer than said first and second sections and defining a second obtuse angle with the second section.

18. A leverage tool as claimed in claim 17, wherein at least one of the first receiver and the second receiver extends substantially perpendicular to the bar axis and has a C-channel shape with an open end.

19. A leverage tool as claimed in claim 17, comprising a winch bar mounted to a second end of the bar member and insertable into a receiving aperture of a winding drum for rotating the winding drum about a rotation axis.

20. A tightening device leverage tool for operating a ratchet buckle having an operating lever pivoting about a ratchet buckle pivot axis, the tightening device leverage tool comprising:
   a bar member with a bar axis;
   a ratchet buckle adapter mounted to the bar member and engageable with the operating lever of the ratchet buckle for pivoting the operating lever about the ratchet buckle pivot axis; and
   a binder adapter provided on the bar member and engageable with a binder handle for pivoting the binder handle about a binder pivot axis, the binder adapter having a handle insertion channel defined continuously in a section of the bar member, contiguous to a first end of the bar member, and the ratchet buckle adapter, and a handle retention member mounted to the bar member and extending above a longitudinal opening of the handle insertion channel, the handle insertion channel being designed to at least partially insert therein the binder handle and the handle retention member preventing the binder handle from being released from the handle insertion channel while pivoting the binder handle about the binder pivot axis.

21. A tightening device leverage tool as claimed in claim 20, wherein the ratchet buckle adapter comprises a first receiver and a second receiver spaced-apart from the first receiver along the bar axis, the first receiver being engageable with a ratchet buckle member and the second receiver being engageable simultaneously with an operating lever member, spaced-apart from the ratchet buckle member.

22. A tightening device leverage tool as claimed in claim 20, wherein the binder adapter comprises binder handle lateral stabilizers mounted to the bar member, proximate to a first end thereof, extending substantially parallel to the bar axis and being spaced apart from one another to receive therebetween a section of the binder handle, a rear end of the binder handle being simultaneously inserted in the ratchet buckle adapter.

23. A tightening device leverage tool for operating a ratchet buckle having an operating lever pivoting about a ratchet buckle pivot axis, the tightening device leverage tool comprising:
   a bar member with a bar axis;
   a ratchet buckle adapter mounted to the bar member and engageable with the operating lever of the ratchet buckle for pivoting the operating lever about the ratchet buckle pivot axis; and
   a binder adapter provided on the bar member and engageable with a binder handle for pivoting the binder handle about a binder pivot axis and having binder handle lateral stabilizers mounted to the bar member, proximate to a first end thereof, extending substantially parallel to the bar axis and being spaced apart from one another to receive therebetween a section of the binder handle, a rear end of the binder handle being simultaneously inserted in the ratchet buckle adapter.

24. A tightening device leverage tool as claimed in claim 23, wherein the ratchet buckle adapter comprises a first receiver and a second receiver spaced-apart from the first receiver along the bar axis, the first receiver being engageable with a ratchet buckle member and the second receiver being engageable simultaneously with an operating lever member, spaced-apart from the ratchet buckle member.

* * * * *